United States Patent [19]

Gerhard et al.

[11] Patent Number: 5,172,485
[45] Date of Patent: Dec. 22, 1992

[54] PRECISION LINEAR MEASURING SUSPENSION SYSTEM HAVING SLIDING CONTACT BETWEEN THE SCALE AND THE PICK-OFF

[75] Inventors: Gregory J. Gerhard, Seattle; Kim W. Atherton, Kirkland, both of Wash.

[73] Assignee: Mitutoyo Corporation, Tokyo, Japan

[21] Appl. No.: 778,002

[22] Filed: Oct. 17, 1991

[51] Int. Cl.⁵ .................................. G01B 7/02
[52] U.S. Cl. ............................ 33/706; 33/558
[58] Field of Search ............. 33/558, 561, 706, 707, 33/708, 501.6, 784; 324/662, 690

[56] References Cited

U.S. PATENT DOCUMENTS

| | | |
|---|---|---|
| 3,138,714 | 6/1964 | Heidenhain . |
| 4,152,837 | 5/1979 | Nelle et al. . |
| 4,566,201 | 1/1986 | Ishii ............................ 33/706 X |
| 4,586,260 | 5/1986 | Baxter et al. ..................... 33/706 |
| 4,603,480 | 8/1986 | Sakagami . |

FOREIGN PATENT DOCUMENTS

| | | |
|---|---|---|
| 0213603 | 9/1986 | Japan ........................... 33/784 |
| 1366284 | 9/1974 | United Kingdom . |
| 1550185 | 8/1979 | United Kingdom . |

Primary Examiner—Harry N. Haroian
Attorney, Agent, or Firm—Seed and Berry

[57] ABSTRACT

In a capacitive-type linear displacement measuring device, a pick-off body is resiliently biased into sliding contact with a scale. The pick-off body is supported by a flat spring and resiliently biased towards the scale by a leaf spring. The front surface of the scale slides in abutting contact with the front surface of the pick-off body. The flat spring restrains non-axial movement of the pick-off body but permits movement normal to the axial movement so that the pick-off body accurately tracks and remains in abutting contact with the scale as it slides in an axial direction. Changes in capacitance caused by axial displacement of the scale are accurately sensed and changes in capacitance caused by non-axial motion are avoided. According to an alternative embodiment, the pick-off body and scale are positioned with their sliding surfaces aligned with the axis of the support member to reduce the moment arm for any friction forces to zero, further reducing the likelihood of inaccurately sensing the axial movement of the scale.

30 Claims, 6 Drawing Sheets

PRECISION LINEAR MEASURING SUSPENSION SYSTEM HAVING SLIDING CONTACT BETWEEN THE SCALE AND THE PICK-OFF

TECHNICAL FIELD

This invention relates to precision linear measuring devices (for micron- and submicron-range precision) having a stationary member and a movable member sliding along the stationary member, and, more particularly, to a mechanism for resiliently biasing the stationary member of a capacitive encoder against the movable member of a capacitive encoder without allowing the stationary member to move along the axis of movement of the movable member.

BACKGROUND OF THE INVENTION

Numerous devices are available for providing accurate linear measurements. Height gauges are available to provide the height of an article. Dial gauges, Digamatic TM indicators, and linear gauge systems are used to precisely measure the thickness or height of an article. Linear and X-Y location and displacement measuring systems are available to accurately measure the linear displacement or the exact position of an article.

Many of the linear measurement systems in use today include a housing having a measuring scale slidably mounted in the housing. A driving member, such as a spindle, is coupled to the scale and to the article whose displacement is being measured. A bushing mounted on the housing and surrounding the spindle is typically used to ensure that the spindle slides smoothly in the housing. A sensor within the housing senses movement of the scale and provides an output indicative of the position of the article, movement of the article, or both. In the prior art, typically, for precision application, this sensor is spaced at a specific distance from the scale, and expensive precision bearings are employed to avoid wear and provide accurate guiding and spacing of the elements.

Different types of sensing systems, scales, and suspension systems are known in the prior art. U.S. Pat. No. 4,603,408, to Sakagami describes a linear scale having an optical grating and an optical sensor for determining movement of the scale. In this type of device, the sensor is typically guided along a stationary scale by roller bearings. A capacitive-type position sensor which senses changes in capacitance to measure displacement is described in U.S. patent application Ser. No. 07/372,773, entitled "Capacitive-Type Measuring Device for Absolute Measurement of Positions" and commonly assigned now U.S. Pat. No. 5,023,559. No particular suspension system is specified, but electronic calipers which are now commonly available exhibit a typical guiding system for this type of device. Such a guiding system is not suitable for high precision measurements. United Kingdom Patent No. 1,366,284 also describes a capacitive sensor in a length measuring system. In many environments, a capacitive sensor is preferred; they are not as complex, fragile, or expensive as optical sensors.

One of the problems with sensors which measure the change in parallel plate capacitance to determine movement of a plate along an axis in the plane of the plate is that the capacitance varies based on movement perpendicular to the plate as well as axial movement along the measuring axis parallel to the plate. As the scale undergoes movement along its measuring axis, the change in capacitance caused by the scale is sensed and electronically processed to determine displacement of the scale. Unfortunately, any movement perpendicular to the axis can cause a change in capacitance which is not caused by axial movement. This undesirable change in capacitance creates errors in sensing the movement of the measured object. As a result, known capacitive length-measuring systems are susceptible to errors unless relatively expensive bearing systems are employed. Another important practical problem with sensors which measure the change in parallel plate capacitance to determine movement of a plate in the plane of the plate is that the capacitive signal strength diminishes rapidly with decreasing plate dimensions and increasing gap, while the costs of practical capacitive encoders decrease approximately with the encoder area (a close analogy can be drawn to the cost behavior of silicon IC's). A small capacitive plate area is a highly desirable practical feature. However, in order to reduce the capacitive plate area while still maintaining sufficient signal strength, a smaller capacitive gap must be maintained. Unfortunately, according to previous suspension designs, a small gap exaggerates the aforementioned sensitivity to non-axial (error-producing) motions and increases the chances of damage to the sensor due to inadvertent contact between the closely spaced relatively moving pieces. In the prior art, expensive precision bearing systems or tedious close-tolerance assembly techniques have been employed to achieve a small operating gap. Either method substantially offsets the cost and versatility benefits of reduced sensor size. Even so, use of an optical measuring system is not permitted in some environments and, where permitted, is significantly more expensive and more delicate such that use of the optical system may not be permitted under some circumstances.

SUMMARY OF THE INVENTION

According to principles of the invention, a scale and a pick-off body within a linear gauge are biased into abutting, sliding contact with each other during axial movement of the scale. A driving member, such as a spindle, may be coupled between the scale and the object whose displacement is to be measured for causing the scale to move linearly as the object moves.

The pick-off body includes a sensor for measuring movement of the scale with respect to the pick-off body. An improved spring suspension system is coupled to the pick-off body and to the housing to resiliently bias the pick-off body into abutting contact with the scale as the scale slides on the surface of the pick-off body. An improved spring member restrains movement of the pick-off body in the direction of axial movement of the scale but accommodates non-axial movement and biases the pick-off body in abutting contact with the scale with exceptionally low contact forces and associated low frictional forces to simultaneously achieve the diverse benefits of improved wear characteristics, accurate measurement of axial motion of the scale, and providing the highest practical capacitive signal strength, while using economic bearing surfaces, and simple assembly. Reasonable expected non-axial movement of the scale or deviations in the scale surface do not create an error in the precision displacement measurement, or significantly increase the friction or wear between the relatively moving pick-off and scale.

DETAILED DESCRIPTION OF THE INVENTION

Figures 1A, 1B:
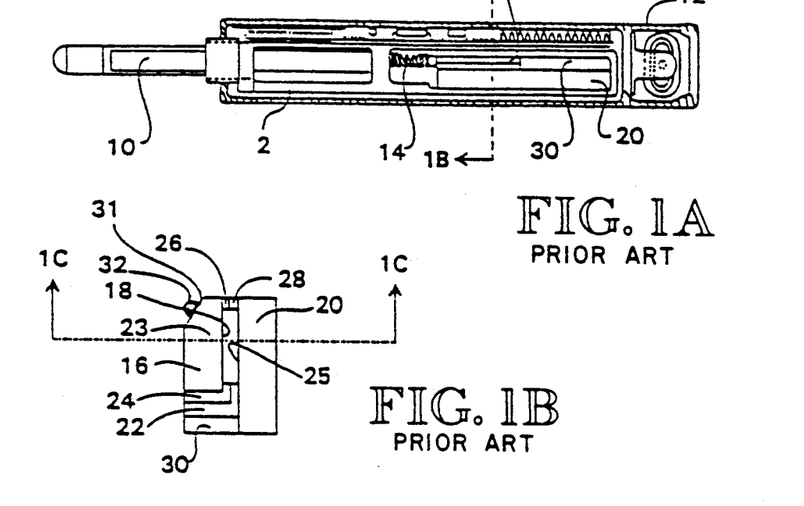
FIG. 1A is a side elevational view of a prior art distance measuring gauge.
FIG. 1B is a cross-sectional view taken along lines 1B—1B of FIG. 1A.
Figure 1C:
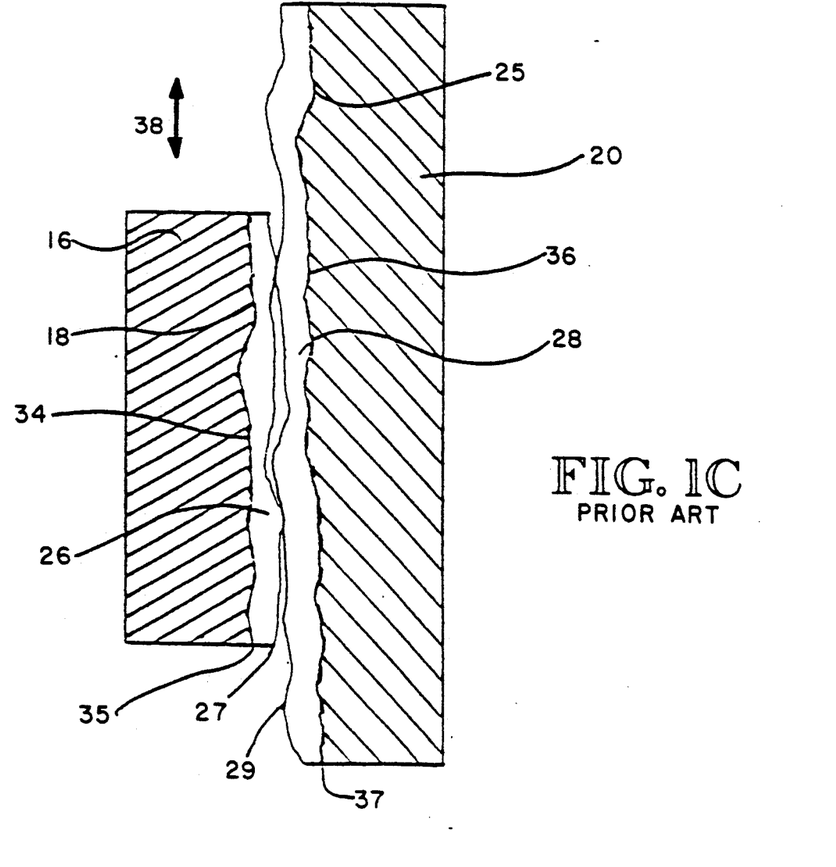
FIG. 1C is an enlarged, cross-sectional view taken along lines 1C—1C of FIG. 1B.

FIGS. 1A, 1B, and 1C illustrate a prior art optical distance-measuring gauge as described in United Kingdom Patent No. 1,550,188. The prior art gauge includes a spindle 10 slidably mounted in a housing 12. The spindle 10 is coupled via a spring assembly 14 to a scale 16. The scale 16 includes an optical grating 34 on a surface 18. A glass block 20 includes an optical grating 36 on a surface 25. A base block 30 is fixed to block 20 to support scale 16, as best shown in FIG. 1B. The scale 16 has a beveled face 31 against which a leaf spring 32 is biased, to urge the scale 16 against glass block 20 and base block 30. The leaf spring 32 is retained against the back of block 16 by a support arm (not shown). The support arm moves with the spindle 10 and is coupled directly to the spindle.

Spacer rails 26 and 28 coupled to scale 16 and glass block 20 respectively provide a low friction, sliding surface to space the scale 16 from the glass block 20. Similarly, spacer rail 24 coupled to scale 16 and spacer rail 22 coupled to base block 30 space and support the scale 16 above the base block 30 and away from the glass block 20. Other solid lubricants, such as carbon, molybdenum disulfide, oil films and the like are also disclosed for use in spacing and lubricating the sliding blocks.

The prior art suspension may be seen to have numerous shortcomings relative to the present invention:

In the prior art the biasing spring is acting on the moving scale 16, not the stationary pick-off. With modern components, the moving scale is typically inherently more massive than the pick-off. To control the motion of the relatively more massive scale, the biasing force must be relatively increased to overcome the forces acting on the scale under the effects of gravity and vibration. The relatively increased biasing force will cause accelerated wear and deterioration at the sliding interfaces, as well as an increased frictional resistance to motion of the scale. Such subtle increases in resistance to motion can cause significant errors in both high precision measurement, and measurement of compliant workpieces. In addition, as the measuring range is increased towards tens of centimeters and beyond, an ever longer, more massive, scale is required. In the prior art, the required biasing force for such massive scales leads to totally impractical levels of frictional resistance to motion of the scale. This severely limits the utility and versatility of the prior art suspension. In addition, in the prior art, in order to maintain sliding contact between sliding scale 16 and fixed glass block pick-off 20, the biasing spring must overcome any forces acting upon the scale through the spring assembly 14, in order to overcome deviations of the scale motion arising from the lack of straightness and alignment of the surfaces which guide the scale 16 and spindle 10. The biasing force arrangement in the present invention does not need to overcome these forces; rather, it accommodates them. Thus, compared to the present invention, the prior art biasing force arrangement requires closer fabrication tolerances and more costly design and fabrication of spring assembly 14 and base block 30, to achieve the same levels of accuracy and low resistance to scale motion.

In addition, in order to achieve control of the gap between the surfaces 18 and 25 by means of an integral sliding interface, the glass block 20 and surface 25 must be "artificially" lengthened beyond the required dimensions of the included grating (sensing) element, for the sole purpose of providing an extended surface for the lengthy moving scale 16, to slide on. By biasing the stationary pick-off element, rather than the moving scale, the present invention can advantageously minimize the dimensions of the pick-off element and avoid the design constraints and economic penalties associated with artificially enlarging precision sensing elements, as in the prior art design.

FIG. 1C is an enlarged, cross-sectional view of the rails 26 and 28 having contact surfaces 27 and 29 respectively between scale 16 and glass block 20 illustrating additional shortcomings of the prior art suspension, particularly with regard to capacitive encoders. The scale 16 moves axially in the direction shown by arrow 38 along the surface of spacer rail 28 of glass block 20. The scale 16 includes a measuring grating 34 on surface 35 which is spaced from the abutting surface 27 of the spacer rail 26 by at least the thickness of the rail. Similarly, glass block 20 includes a sensing grating 36 on a surface 37 which is spaced from the abutting surface of spacer rail 28 by at least the thickness of the spacer rail 28. The grating 34 has a front surface 35, and the rail 26, a front surface 27. The back surface 23 of rail 26 abuts the front surface 35 of grating 34. Thus the grating surface 35 is not always parallel with the contact surfaces 27, but will change in distance from the contact surface 27 based on any changes in the thickness of rail 26. The manufacturing tolerances for the thickness of rail 26 thus become very critical and add another level of complexity in constructing a gauge that measures accurately. One drawback of the sliding rails 26 and 28 of FIG. 1C then becomes that local changes in the thickness of rails 26 and 28 may cause changes in the distance between the optical gratings 34 and 36. The distance variation between refractive gratings 34 and 36 does not create significant errors or signal strength reduction because the sensor is an optical sensor. However, for capacitive gratings, this can introduce significant errors. The undulations in the rail surfaces 27 and 29 may not match the undulations in the respective grating surfaces 35 and 37. At the point where rails become thicker, the effect is to increase the distance between the scale 16 and pick-off 20, but the grating surfaces 35 and 37 may be flat, so that if a capacitive grating is employed, a change in capacitance results from the gratings 18 and 25 being pushed apart from each other (or pushed closer together) rather than from axial displacement of scale 16. Thus errors are produced.

Figure 7A:
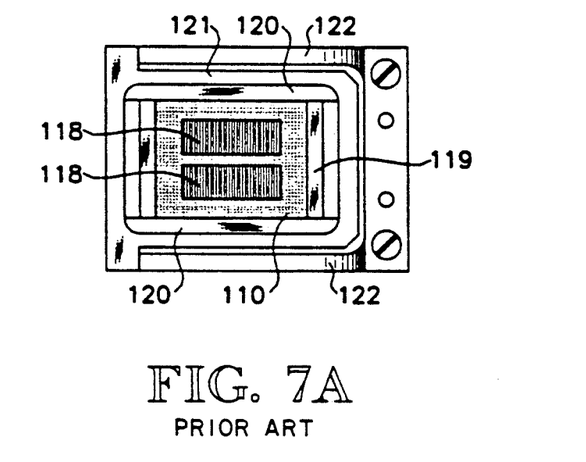
FIG. 7A is a cut away side view of a prior art suspension.
Figure 7B:
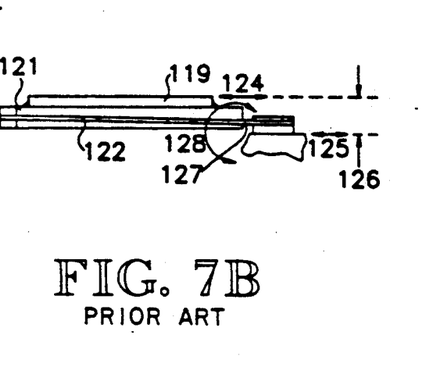
FIG. 7B is a side view of a portion of 7A.
Figure 7C:
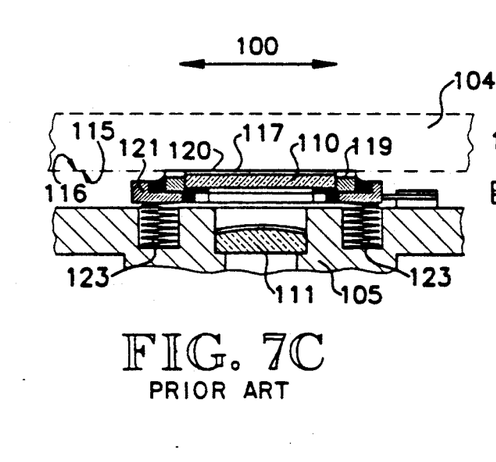
FIG. 7C is a plan view of the suspension and sensing gratings shown in 7A.

Referring now to FIGS. 7A, 7B, and 7C, an apparatus disclosed in U.S. Pat. No. 3,138,714 (the '714 patent) for the determination of the relative position of two parts is described. A measuring scale 104 is moved relative to a reference housing 105 along the measuring axis 100, (however, due to unavoidable inaccuracies of the guiding elements, the movement is not exactly linear). Optical detector elements 111 are supplied, as are other optical system elements which are not shown since they are well known and not relevant to the present invention. The scale element 104 has within its surface plane 115 a grid-like division 116 which acts as a conventional optical measuring grating. Likewise, the sensing plate 110 has on its face 117, disposed opposite the plane 115, two gratings 118 and 118', the phases of which are set to provide conventional optical quadrature signals for motion detection and position detection when suitable illuminated through optical grating 116. The spacing between grating 116 and the gratings 118 and 118' is recommended to be on the order of 10 microns. In order to maintain the sensing plate 110 at the predetermined distance from the grating 116, whereby, however, simultaneously a constant position of the sensing plate 110 relative to the reference housing 105 in the direction of the measuring axis 100 is to be maintained, the sensing plate 110 is fastened with putty or the like to a rectangular frame 119 of polyfluorineethylene, the longitudinal edges 120 of which extend beyond the grating surfaces and serve as slide rails for engagement of the grating plane 115. The material provided for the frame 119 is characterized by a particularly low friction coefficient suitable for the slide rails 120. The frame 119 in turn is inserted, for instance by means of putty, into a metal frame 121, which is retained by two spring blade arms 122 extending parallel to the grating plane 115, which spring blade arms 122 are connected with the reference housing 105. Pressure springs 123, supported by the reference housing 105, provide a completely satisfactory engagement of the slide rails 120 on the grating plane 115.

This construction is in one aspect superior to the rail construction described in FIG. 1C. The natural surface 115 of scale member 104 is employed as a sliding surface, thus only the rails 120 must be fabricated and controlled for thickness and flatness. However, the rails still cover only a comparatively small surface area, and are therefore subject to greater gap variations due to local flatness variations of the surface 115, and to higher operating pressures and higher wear rates than the present invention. The shortcoming with regard to surface pressures and wear rates can be exaggerated by another shortcoming of the design: During relative motion, the friction at surface 115 gives rise to frictional forces 124 acting at the surface of rails 120. This gives rise to reaction forces 125 acting in the plane of spring blade arms 122. Forces 124 and 125 are separated by distance 126, giving rise to a moment 128 about hinge point 127. This moment inevitably gives rise to a nonuniform pressure distribution along the length of rails 120, which will begin to wear more rapidly at the left and right ends (under reversing relative motions of the measuring and sensing gratings), and become out of flat. Once the rails 120 become worn at the ends, the sensing plate 110 will begin to teeter back and forth on the high center during reversed motion, both exaggerating wear, and causing gap variations from one end of the sensing plate to the other, due to pitching. For high precision measurement, such accelerated wear rate, and gap instability, can introduce significant errors, particularly for capacitive grating sensors.

In addition, by suspending spring blade arms in a cantilever fashion from one end, unmatched thermal expansion due to dissimilar materials can displace the sensing plate 110 relative to the reference housing 105, during temperature variation, thus introducing a measurement error.

The setting of the gap between the grating surfaces using this prior art requires close tolerance assembly and employs additional rectangular frame 119. An air gap is required according to the '714 patent. "An immediate or direct engagement of the two faces 15 [115 herein] and 17 [117 herein] cannot be considered, due to the danger of scratches on the grating brought about by such an arrangement," col. 3, lines 12-15 of the '714 patent.

A capacitive sensor such as the type disclosed in United Kingdom Patent No. 1,366,284, or in U.S. Pat. No. 4,420,754, incorporated herein by reference, includes a series of capacitor electrodes for sensing axial displacement of a scale with respect to a pick-off. As is well known, the capacitance between two electrodes diminishes considerably as the gap between the two electrodes increases. The dielectric constant of the material between two plates of a capacitor also significantly affects the capacitance. Air has a very low dielectric constant to the detriment of capacitive signal strength and the associated signal to noise ratio of the displacement sensing system. Similarly, adhesive, oil, and other materials which may be present between grating 116 and gratings 118 have significantly different dielectric constants than air or each other. Errors may thus be introduced by foreign materials accumulating in an air gap between two capacitive gratings. Such factors prevent precision measuring of axial displacement using a capacitive sensor. Also, as may be appreciated, depending on materials and processing cost, the surface 115 and the rails 120 may not be perfectly flat or smooth. Rather, the rails and sensor surfaces may include small undulations, pits, cracks, or even chips which may be seen when they are greatly magnified. For given materials, surface quality and flatness, the localized rails, of limited width and area, will show exaggerated wear and also exaggerated gap variation due to material flatness and process thickness variations when compared to the reduced contact pressure and increased averaging of material and process non-uniformities provided by a continuous contact zone over the entire sensor surface, as contemplated by the present invention. The prior art therefore has the shortcoming of weakening the capacitive signal strength and introducing errors into the displacement measurement. The precision of the capacitive measurement is limited by the signal strength practically achieved and by the errors introduced by changes in capacitance not corresponding to axial displacement of the scale.

Figure 2A:
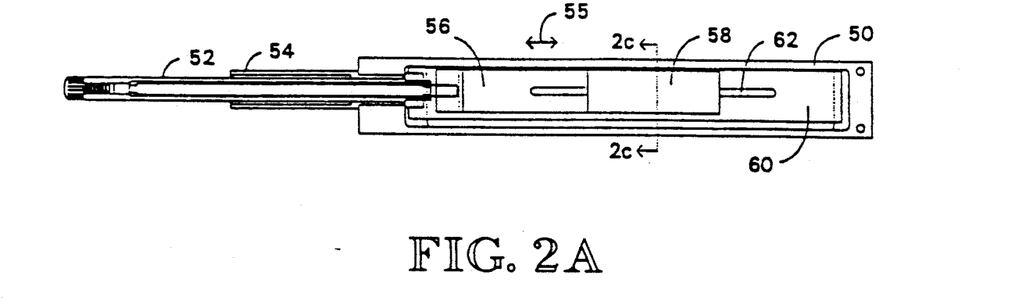
FIG. 2A is a top plan view of a linear measuring apparatus incorporating the invention.
Figure 2B:
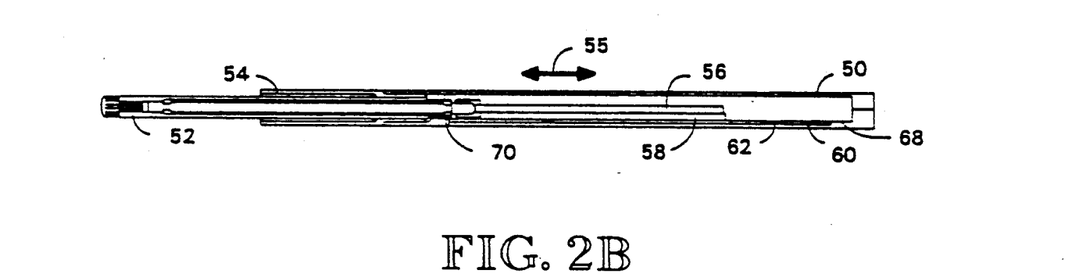
FIG. 2B is a side elevational view of the linear measuring apparatus of FIG. 2A.
Figure 2C:
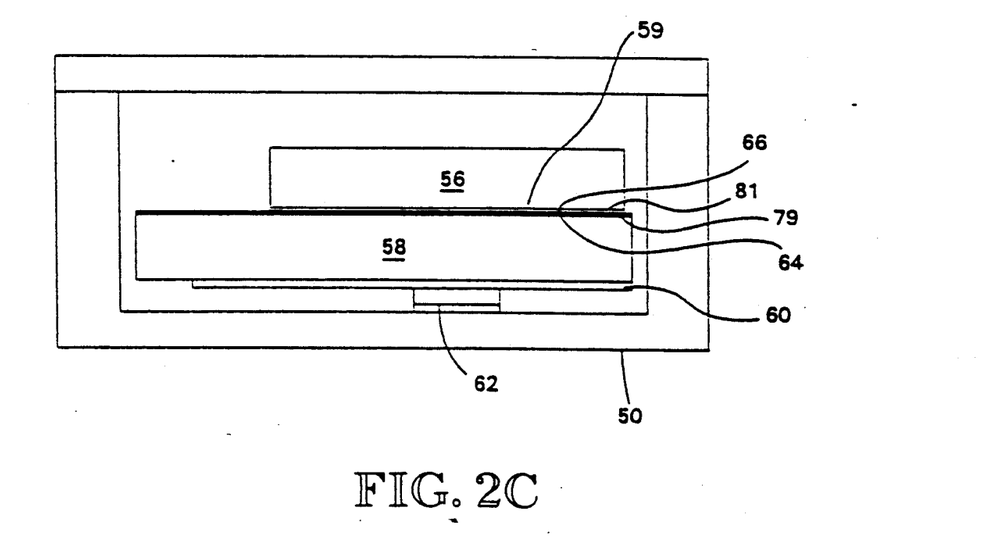
FIG. 2C is a cross-sectional view taken along lines 2C—2C of FIG. 2A.

FIGS. 2A–2C illustrate a precision linear measuring device using a capacitive sensor according to principles of the present invention. The inventive capacitive sensor includes a housing 50 having a spindle 52 slidably coupled thereto via a bushing 54. The spindle 52 extends into the housing 50 and contacts a scale 56. Examples of a suitable bushing and spindle are shown in U.S. patent application Ser. No. 07/619,365, filed Nov. 28, 1990, now U.S. Pat. No. 5,125,165 incorporated herein by reference, and also in the prior art device illustrated in FIG. 1.

The scale 56 is slidably mounted within the housing 50 to permit axial movement in the direction shown by arrow 55 and restrain movement in other directions. The scale 56 includes a series of capacitive electrodes adjacent front surface 64, of a suitable type, such as that disclosed in U.K. Patent No. 1,366,284 or pending U.S. patent application Ser. No. 07/661,840, filed Feb. 26, 1991 and incorporated herein by reference.

A pick-off body 58 is rigidly coupled to a flat spring 60, and the flat spring 60 is rigidly coupled to the housing 50 at ends 68 and 70, respectively. The pick-off body 58 is coupled to the flat spring 60, and the flat spring 60 is coupled to the housing 50 by any suitable method, such as a rigid adhesive. The pick-off body 58 includes a suitable sensor, such as a capacitive electrode 59 adjacent the front surface 66, for sensing axial displacement of the scale 56 with respect to the pick-off body 58. Thin dielectric layers 79 and 81 are formed on the front surfaces 66 and 64 of the pick-off body 58 and scale 56, respectively, as discussed in more detail elsewhere herein. (The dielectric layers 79 and 81 are not necessarily shown to scale and will usually be quite thin, depending on the desired properties.) A leaf spring 62 is positioned between the flat spring 60 and the housing 50 to resiliently bias the front surface 66 of pick-off 58 into abutting contact with the front surface 64 of scale 56. Any suitable spring, such as a coil spring, comb disc spring, elastomer, or the like may be used in place of leaf spring 62 if desired.

Figure 3A:
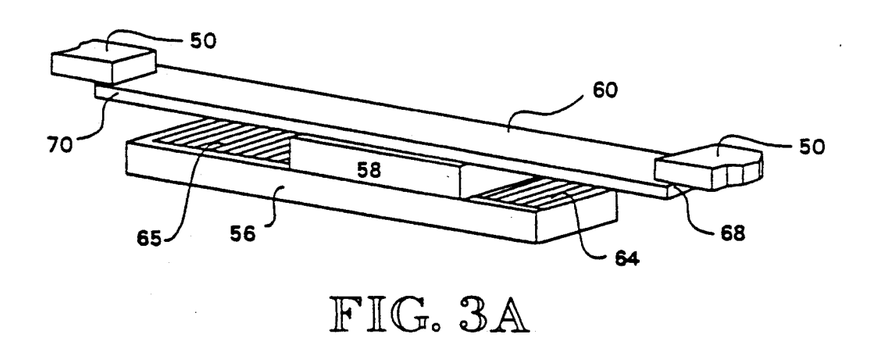
FIG. 3A is an enlarged, isometric view of the pick-off suspension system in the inventive linear measuring apparatus.

FIG. 3A is an isometric view more clearly illustrating the structural arrangement that ensures sliding contact according to principles of the invention. Including FIGS. 3B and 3C, the flat spring 60 is coupled at each end 68 and 70 to the housing 50. The flat spring 60 is of a material and shape which has very low compressibility along its longitudinal axis but is flexible in planes normal to the longitudinal axis and especially normal to its surface. A band of high quality steel is suitable material for the flat spring 60. A band of steel has the desired properties of being relatively nonstretchable and noncompressible longitudinally while being sufficiently flexible to permit some twist, some pitch variation from end to end, and flexing, normal to its longitudinal axis.

Figure 3B:
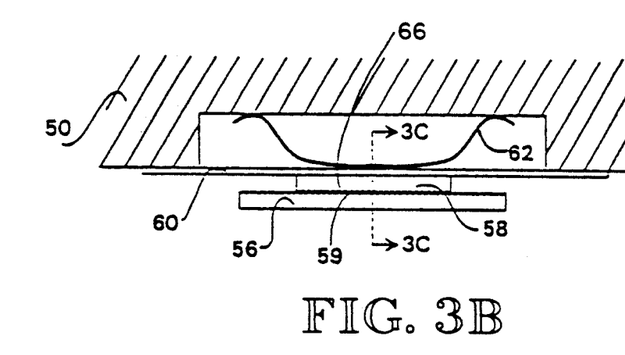
FIG. 3B is a side elevational view of the pick-off suspension system of FIG. 3A.
Figure 3C:
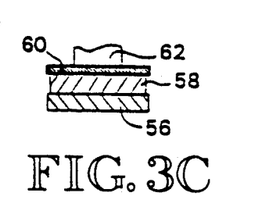
FIG. 3C is a cross-sectional view taken along lines 3C—3C of FIG. 3B.

As the scale 56 slides across surface 66 of pick-off 58, the flat spring 60 is resiliently biased by leaf spring 62 to ensure that the front surface 66 of the pick-off 58 remains in abutting contact with the front surface 64 of the scale 56. The flat spring 60 thus allows the pick-off 58 to move easily to accommodate motions toward and away from the nominal surface position of the scale 56 while preventing movement of the pick-off 58 along the axis of movement of the scale 56.

As illustrated in FIGS. 3A and 3B, a capacitive grating 65 is on the front surface 64 of scale 56 and a capacitive grating 59 is on a front surface 66 of the pick-off 58. The capacitive gratings 65 and 59 are as close to the abutting surfaces as possible, but, because they are electrically conductive, must not directly contact each other or the capacitor would short out.

The pick-off body 58 and scale 56 are constructed by any suitable technique. According to one embodiment, the pick-off body and scale are constructed from industrial grade silicon, of the type used in making integrated circuits. The physical, chemical, and electrical properties of such silicon substrates are well-known and equipment for manufacturing articles from such silicon is readily available. Alternatively, the substrate may be quartz, sapphire, or any other suitable material. The capacitive grating is constructed using the techniques known in semiconductor and micromachining industry. For example, a thin layer of a conductive metal, such as aluminum, chromium, tungsten, gold, or the like, is deposited on the substrate. A grating is then formed by micromachining techniques, such as masking with a photoresist, developing the photoresist, and etching a pattern into the conductive layer to form the grating that is one plate of the capacitor. Etching is performed by a reactive ion etch, a laser beam, wet or dry chemical etch, or any other known micromachining technique.

A thin coating of a dielectric material is applied to the surface of at least one grating to cover the electrodes and insulate them from each other. In one embodiment, the dielectric layer is formed on only one of the surfaces, either that of the pick-off body 58 or the scale 56, and the other electrode remains exposed. The single dielectric layer on only one grating results in sufficient dielectric strength and smoothness. In another embodiment, both surfaces are coated with a thin, dielectric layer. The coating is preferably thin and as friction free as possible because it is the sliding contact surface between the scale 56 and the pick-off 58. A coating layer of epoxy filled with Teflon and ceramic particles applied to a thickness of 5 microns has been found to be suitable for this dielectric, sliding contact surface layer. The Teflon filled epoxy layer covers the electrodes 65 and 59, respectively, to insulate them from each other and provide a sliding contact surface. Alternatively, the surface of the gratings 65 and 59 may be covered with a dielectric layer by oxidizing the substrate, or depositing a thin film. Growing or depositing a thin oxide, insulating layer on a silicon substrate is done according to known semiconductor techniques.

It will be appreciated that by using semiconductor technology, extremely small scale gratings for the capacitive plates can be constructed. The gratings may have a thickness (that is, a height above the substrate) of about 1000 Angstroms or less. The gratings may have a width of 1 to 0.5 microns or less with a spacing in the micron or submicron range. Therefore, very small movements can be detected. Alternatively, the capacitive gratings 59 and 65 can be formed on a PC board by known circuit board fabrication techniques as well.

Maintaining the front surfaces 64 and 66 of scale 56 and pick-off 58, respectively, in abutting contact over the broad planar surface of the pick-off 58 significantly increases the signal strength and gap uniformity, and therefore the accuracy and precision of measurements made by a capacitive sensor. The value of a capacitor is determined by the dielectric constant of the dielectric, area of the plates and distance between, according to the following formula:

$$C = M(KA/d)$$

where C is the capacitance, M is a proportionality constant, K is the dielectric constant of the material, A is the area of the plates and d is the distance between the plates. A large capacitance is preferred, to obtain high signal strength. For a high capacitance, the dielectric constant should be high and the distance between the plates as short as possible. The dielectric constant for a preferred material, such as the epoxy layer, is relatively constant as compared to the changes in the dielectric constant from one material to another and large compared to the dielectric constant of other materials. Air, in particular, has a relatively low dielectric constant, and tends to reduce the capacitive signal strength.

By retaining abutting contact between the sliding surfaces, the nominal signal strength is increased and gap variations are minimized so different material, such as air, is prevented from causing a significant change in the capacitance between the capacitive sensor in pick-off 58 and the capacitive grating in scale 56. Having the gratings in the surfaces that are in contact with each other produces a very short plate distance and using only a single dielectric layer on one grating (or a thin layer on each grating) maintains this distance as small and constant as possible, resulting in a large and highly uniform capacitance. Similarly, by using an insulating layer, such as epoxy or an oxide, for the dielectric between the plates (rather than air) increases the dielectric constant which also increases the capacitance. Having the pick-off 58 and scale 56 in sliding contact results in a greater signal strength as well as uniform results. Even though the surfaces 64 and 66 may not be exactly flat, by resiliently biasing the pick-off 58 into the scale 56, the front surfaces 64 and 66 remain in abutting contact at all times. Any undulations, depressions, or slight variations in the flatness of the surfaces are compensated for because the surface 64 exactly tracks long range undulations and tends to span short range defects by riding on a plurality of "high points" of a constant average height, and thus remains in the most uniform practical abutting contact with the surface 68 at all times. Variations in the flatness of surface 66 may be accommodated by the pick-off body 58 undergoing yaw, pitch, roll, or movement normal to the axial direction by flat spring 60 undergoing the appropriate motion while being resiliently biased by leaf spring 62.

Numerous advantages are obtained by having the full surfaces 64 and 66 in contact with each other. Surfaces 64 and 66 are relatively large area, planar surfaces. If there is a discontinuity, it will be very small compared to the large surface. The smoothness and flatness of the large surface area as a whole will determine the contact surface area (rather than a thin rail, as is now done in the prior art). The effect of local discontinuities is thus averaged out or effectively eliminated. A further advantage is that the spacing between the capacitive gratings remains quite constant as the scale moves. The surfaces in contact with each other are the top surfaces of the scale and pick-off themselves, not a separate rail member that has been attached to scale. The capacitive gratings are in the surfaces that are in contact. A thin, and highly uniform layer of epoxy may coat either or both the electrodes; but this can be made very uniform in thickness and quite flat, so that the space between the two electrodes is very constant. The large, planar contact surface area thus ensures that any changes in capacitance are the result of axial motion of the scale only. For micron and submicron gratings, ensuring that any changes in capacitance or in the position of the scale and pick-off relative to each other result only from axial motion of the scale, becomes important.

Leaf spring 62 may be a separate member or, alternatively, an integral piece of flat spring 60. In one embodiment, a strip in the central portion of flat spring 60 is partially punched out to provide a bent leaf spring portion extending from the band 60 and contacting the housing 50 to resiliently bias the band 60 away from the housing 50. Alternatively, spring 62 can be omitted and the natural compliance of the flat spring 60 can provide the force to resiliently bias the pick-off 58 into abutting contact with the scale 56, either by slightly deforming spring 60 prior to assembly, or by selecting a suitable offset of the anchor points 68 and 70, to achieve a slight nominal deflection of flat spring 60.

The pick-off body 58 does not move axially as the scale 56 slides along the surface because the flat spring 60 is not stretchable or compressible in the direction of motion and the effective center of rotation of the pick-off for any "pitching" motion is near to the sliding interface, which effectively prevents pitching from causing axial motion along the interface. Axial movement of scale 56 is accurately sensed by pick-off 58 while accommodating scale and pick-off movement in non-axial directions.

Figure 4A:
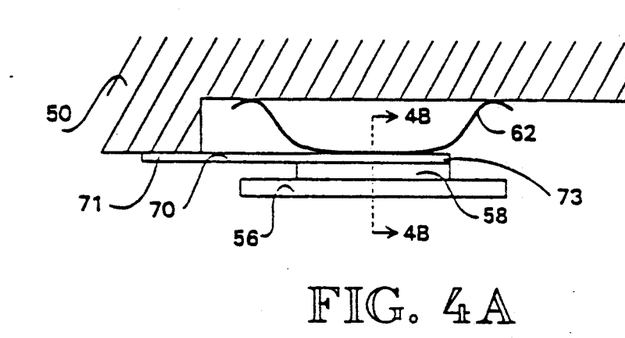
FIG. 4A is a side elevational view of an alternative embodiment of the invention.
Figure 4B:
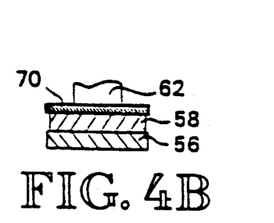
FIG. 4B is a cross-sectional view taken along lines 4B—4B of FIG. 4A.

FIG. 4A and 4B illustrate an alternative embodiment for providing sliding contact between the pick-off body 58 and the scale 56. A flat spring 70 extends from the housing 50 at a first end 71, and the second end 73 is not coupled to the housing. The flat spring 70 extends from the housing 50 to provide structural support for the pick-off body 58, and the spring 62 resiliently biases the flat spring 70 to ensure abutting contact between the pick-off body 58 and the scale 56. Having the second end 73 free is advantageous in some embodiments because greater movement normal to the axial direction is permitted without causing undue stretching or compressing of the flat spring 70 in the axial plane. Flexing, yaw, or pitch of the flat spring 70 are more effectively decoupled from each other and from the axial compression and stretching of leaf spring 70 if one end 73 is permitted to float with respect to the housing 50.

Figure 5A:
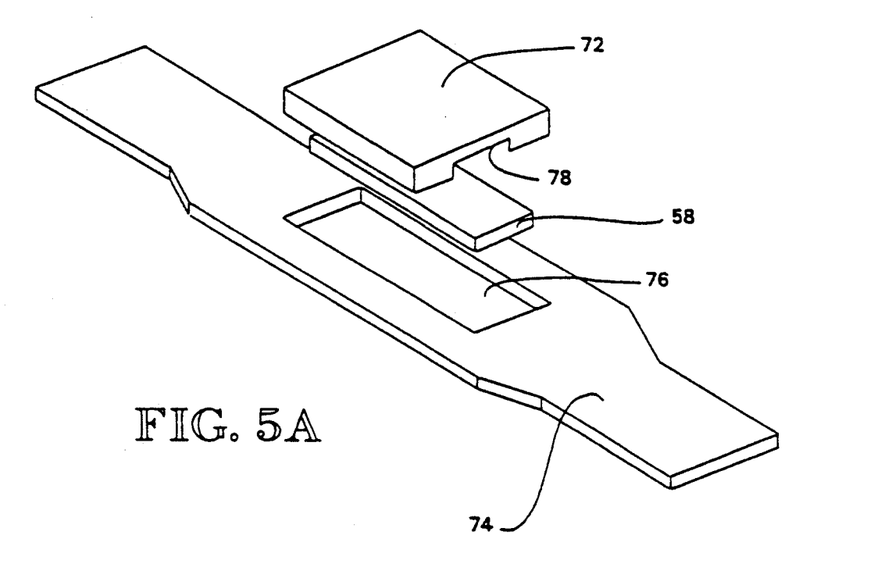
FIG. 5A is an isometric, exploded view of an alternative embodiment of the suspension system of the invention.
Figure 5B:
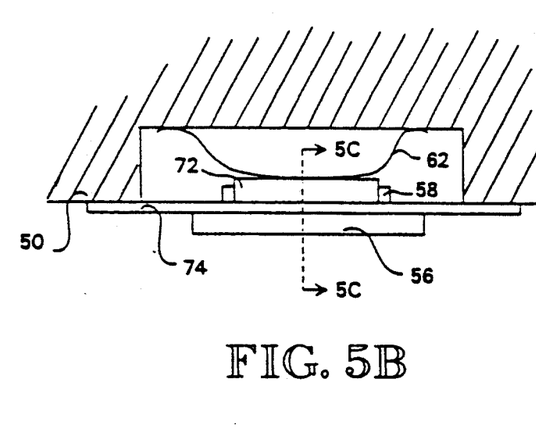
FIG. 5B is a side elevational view of the alternative embodiment of FIG. 5A.
Figure 5C:
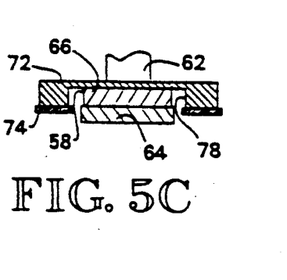
FIG. 5C is a cross-sectional view taken along lines 5C—5C of FIG. 5B.

FIG. 5A–5C illustrate an alternative embodiment for mounting the pick-off member 58 to reduce the moment arm, associated with the reaction force generated at the pick-off attachment and the friction force generated along the sliding surfaces 64 and 66, to zero. As can be appreciated, as front surface 64 of scale 56 slides along front surface 66 of pick-off body 58, some friction force results. The force of friction creates a moment of rotation about flat spring 60 proportional to the height of pick-off body 58. In some embodiments, the height of the reaction point of pick-off body 58 is sufficiently small and the friction along the sliding surface is sufficiently low that any movement by force about this moment arm is negligible and does not affect the precision or accuracy of the measurement. However, in some embodiments for very high precision it is desirable to reduce this moment arm to zero for reduced wear and reduced "pitching" under reversed motion.

According to the alternative embodiment as shown in FIG. 5A, the flat spring 74 is provided with an aperture 76 into which the pick-off body 58 is positioned. A coupling body 72 is rigidly fixed to the pick-off body 58 and also rigidly fixed to the flat spring 74. The coupling body 72 includes a recess 78 for receiving the pick-off body 58. The depth of the recess 78 is selected to align the front surface 66 of the pick-off body 58 in approximately the same plane as the center plane of the flat spring 74, as best illustrated in FIGS. 5B and 5C. The sliding contact surfaces 64 and 66 are aligned approximately at the axial plane of flat spring 74 to reduce the moment arm to zero. Any friction force caused between the surfaces 64 and 66 does not cause any rotation of the flat spring 74 because the friction is in a plane aligned with the plane of the flat spring 74. Any error which may have been introduced by the pick-off body 58 changing pitch because of the sliding friction force is eliminated by this structure because the moment arm is reduced to zero.

Figure 6A:
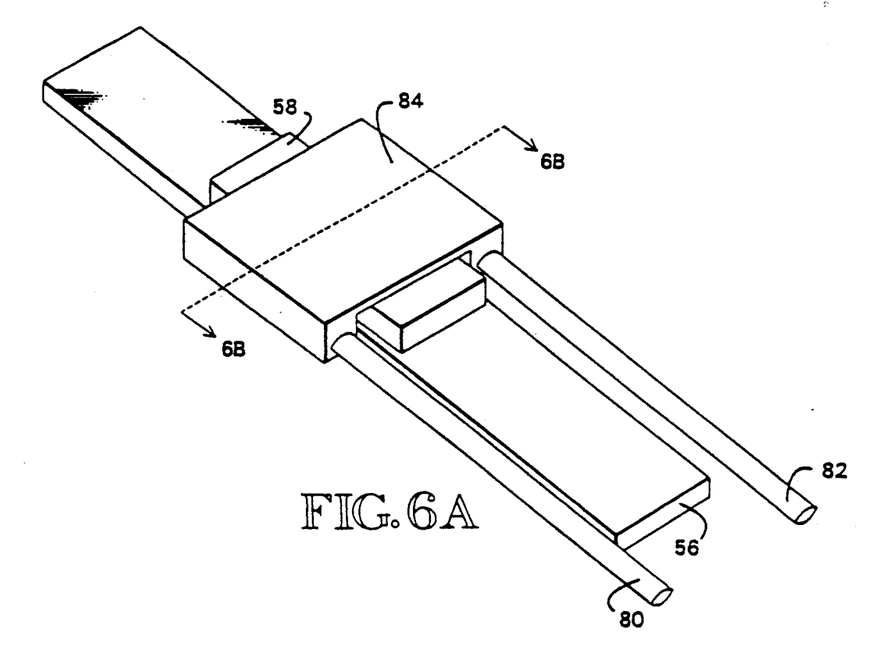
FIG. 6A is an isometric view of an alternative embodiment of the suspension system of the invention.
Figure 6B:
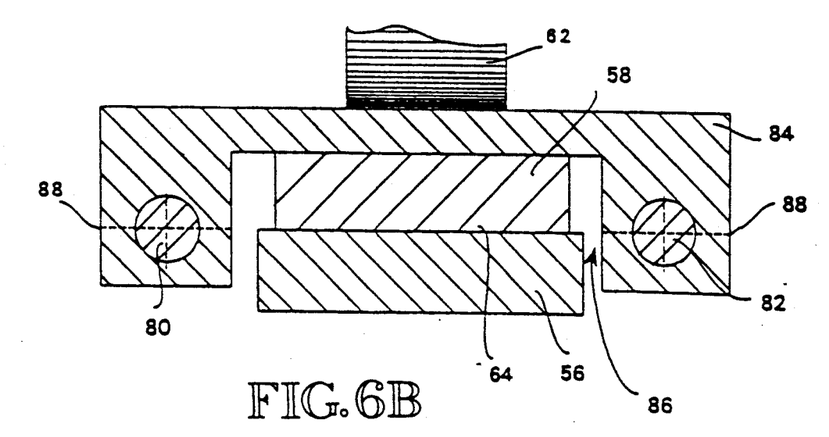
FIG. 6B is a cross-sectional view taken along lines 6B—6B of FIG. 6A.

FIGS. 6A and 6B illustrate an alternative embodiment for reducing the moment arm to zero along sliding surfaces 64 and 66. As shown in FIG. 6A, a pair of support rods 80 and 82 are rigidly coupled to a carriage 84 which retains the pick-off body 58 into abutting contact with the scale 56. A leaf spring 62 attached to the carriage 84 resilient biases the pick-off body 58 into abutting contact with the scale 56. The carriage 84 includes a recess 86 of a selected depth to receive the pick-off body 58 with its front surface 66 in alignment with the horizontal axis 88 of the support rods 80 and 82. Support rods 80 and 82 are rigidly coupled to the housing 50 and are noncompressible along their longitudinal axes to restrain axial movement of the pick-off body 58. The support rods 80 and 82 are sufficiently flexible in the non-axial direction to permit yaw, pitch, movement normal to the axial direction, roll, or other movement of the pick-off body 58 as the front surface 66 of the pick-off body 58 remains in abutting contact with the front surface 64 of the scale 56.

Having the sliding surfaces 66 and 64 aligned with the horizontal axis 88 reduces the moment arm at the sliding friction interface to zero to ensure that errors are not introduced by movement of the pick-off 58 with respect to the scale 56.

An inventive structure has been described, including numerous embodiments for providing precise and accurate sensing of axial displacement using a capacitive sensor. Sliding contact between the pick-off body carrying the sensor and the scale 56 ensures a signal strength of a practical maximum is economically obtained, and that any changes in sensing capacitance are caused by the desired axial movement rather than by other factors. Different structures than those disclosed herein which provide this function using an equivalent structure fall within the scope of this invention.

We claim:

1. A linear measuring apparatus comprising:
   a housing;
   a scale slidably mounted within said housing so that said scale can move in an axial direction;
   a pick-off body coupled to said housing, said pick-off body having a front surface retained in sliding contact with said scale, said pick-off body including a sensor for measuring movement of said scale with respect to said pick-off body; and
   a spring assembly coupled to said pick-off body and to said housing and resiliently biasing said pick-off body into abutting contact with said scale as said scale slides on a surface of said pick-off body, said spring assembly restraining movement of said pick-off body in said axial direction while permitting movement normal to said axial direction so that axial movement of said scale is accurately sensed.

2. The apparatus according to claim 1 wherein said spring assembly includes:
   a flat spring rigidly coupled to said pick-off body and to said housing, said flat spring lying in a plane that is substantially parallel to the axis of movement of said scale; and
   a leaf spring coupled to said flat spring and to said housing for biasing said flat spring towards said scale for retaining said front surface of said pick-off body in abutting contact with said scale.

3. The apparatus according to claim 2 wherein said flat spring includes a first end and a second end and said pick-off body is rigidly coupled to said flat spring in a central portion between said first end and said second end; and
   said flat spring is rigidly coupled to said housing at said first and second ends.

4. The apparatus of claim 3 wherein said central portion where said pick-off body is rigidly attached is effectively co-linear with said first and second end attachment points of the flat spring to the housing, so that the bending moment due to frictional forces and reaction forces is substantially zero in the plane of the flat spring and so that in-plane bending of the flat spring is substantially eliminated, and axial deflection of the pick-off due to frictional forces if limited by the axial tension and compression characteristics of the flat spring.

5. The apparatus according to claim 2 wherein said flat spring includes a first end and a second end and said spring is rigidly coupled at said first end to said housing, said pick-off body being rigidly coupled to said flat spring adjacent said second end of said flat spring and said second end is not coupled to said housing.

6. The apparatus of claim 4 wherein said rigid coupling area of the pick-off body adjacent to the second end is effectively co-linear with a line parallel to the axis of motion of the scale extending through the effective rigid coupling point of said first end of the flat spring to said housing, so that the bending moment due to frictional forces and reaction forces is substantially zero in the plane of the flat spring and so that in-plane bending of the flat spring is substantially eliminated, and axial deflection of the pick-off due to frictional forces is limited by the axial tension and compression characteristics of the flat spring.

7. The apparatus according to claim 2 wherein said flat spring includes an aperture and said pick-off body is mounted within said aperture with said front surface of said pick-off body in approximately the same plane as said flat spring to reduce the moment arm between sliding friction forces and support reaction forces acting on said pick-off body to approximately zero with respect to said flat spring.

8. The apparatus according to claim 1, further including:

a pick-off support member rigidly coupled to said pick-off body; and said spring assembly includes a pair of rods extending from said housing and coupled to a pick-off support member on either side of said pick-off body, said rods each having an axis in approximately the same plane as said front surface of said pick-off body.

9. The apparatus according to claim 1 wherein said spring assembly includes:

a flat spring which is deformed prior to assembly and then rigidly coupled to said pick-off body and to said housing such that following assembly said flat spring is deflected back to a substantially flat configuration, thereby resiliently biasing said pick-off into abutting contact with said scale without the need for additional biasing springs, and said flat spring lying in a plane that is substantially parallel to the axis of movement of said scale.

10. The apparatus according to claim 1 wherein said pick-off body and said spring assembly are integrally formed of a single material and piece.

11. The apparatus according to claim 10 wherein said integral pick-off body and spring assembly are miniature elements formed by micromachining.

12. The apparatus according to claim 1 wherein said slidably mounted scale is restricted to very short axial motions and is substantially restricted in other degrees of freedom of motion by flexures which connect it to said housing.

13. The apparatus according to claim 1 wherein said sensor in said pick-off body includes a capacitive electrode grating coupled to a front surface of said pick-off and further including:

a capacitive electrode grating coupled to a front surface of said scale;

a thin insulating dielectric layer overlying at least one of said capacitive gratings, said dielectric layer completely covering said capacitive grating and forming the sliding contact surface between said pick-off body and said scale.

14. The apparatus according to claim 13 wherein said dielectric layer is epoxy filled with Teflon particles.

15. A linear measuring apparatus comprising:

a scale means slidably coupled within a housing for moving axially in response to motion of an object whose displacement is to be measured, said scale means including a periodic pattern means for providing sensing of axial motion of said scale means;

a sensor means within said housing for sensing axial movement of said scale means, said sensor means including a pick-off body having a front surface in abutting contact with said scale means; and a spring assembly means coupled to said pick-off body for biasing said pick-off body into abutting contact with said scale means as said scale means moves axially within said housing means and for permitting said pick-off body to move normal to said axial motion and for restraining said pick-off body from moving axially to minimize errors caused by non-axial motion of said pick-off body relative to said scale and to accurately sense axial motion of said scale.

16. The apparatus according to claim 15 wherein said sensor means includes capacitive electrodes in said pick-off body and said scale includes capacitive electrodes for sensing axial motion of said scale by changes in capacitance as said scale moves axially with respect to said pick-off body.

17. The apparatus according to claim 15 wherein said pick-off body is rigidly coupled to said spring assembly means.

18. The apparatus according to claim 17 wherein said spring assembly means includes a flat spring rigidly coupled to said housing and a leaf spring rigidly coupled to said flat spring and to said housing and biasing said flat spring away from said housing and said pick-off body into abutting contact with said scale means.

19. The apparatus according to claim 15 wherein said apparatus also includes a drive means slidably coupled to said housing and contacting said scale means to transfer motion of said object to said scale means, said driving means including a spindle slidably coupled to said housing, said spindle having a hollow shaft and a rod positioned within the hollow shaft of said spindle, said rod having a first end connected to a tip of said hollow shaft and a second end connected to said scale means so that axial motion of said object is transferred to said scale means via said rod and non-axial motion of said spindle is decoupled from axial motion of said scale.

20. The apparatus according to claim 15 wherein said spring assembly means includes a flat spring rigidly coupled at one end to said housing and free at said other end.

21. The apparatus according to claim 15 wherein said spring means includes a pair of support rods rigidly coupled to said housing and to a support carriage, said support carriage including a recess into which said pick-off member is positioned, the depth of said recess being selected to align a front surface of said pick-off member with a horizontal axis of said pair of support rods to reduce the moment arm of force caused by said scale sliding at said front surface to approximately zero.

22. The apparatus according to claim 15 wherein said spring assembly includes a flat spring having a uniform width along the entire length thereof.

23. The apparatus according to claim 22 wherein said flat spring is constructed of a material which is relatively non-compressible in a longitudinal, axial direction but is flexible in planes orthogonal to said longitudinal, axial direction to permit said flat spring to undergo pitch, roll, and linear motion normal to said longitudinal axis for accurately sensing axial motion of said scale but accomodating non-axial motion of said pick-off body induced by contact with said scale.

24. A linear measuring apparatus comprising:

a scale slidably coupled within a housing and adapted to be coupled to an object whose movement is to be measured, said scale moving axially in response to movement by said object, said scale having a front surface;

a capacitive grating mounted in said front surface of said scale;

a thin dielectric layer on said front surface of said scale and overlaying said capacitive grating, said dielectric layer being generally planar and smooth to provide a large area, low friction surface area for sliding contact;

a pick-off member mounted within said housing in abutting contact with said scale, said pick-off member being mounted to maintain a fixed axial location while said scale undergoes axial motion for detecting axial motion of said scale, said pick-off member having a front surface;

a capacitive grating mounted in said front surface of said pick-off member;

a thin dielectric layer on said front surface of said pick-off member and overlaying said capacitive grating, said dielectric layer being in abutting contact with said dielectric layer of said scale and being generally planar and smooth to provide a large contact area, low friction surface for sliding contact with said scale;

an electrical circuit within said housing and coupled to said respective capacitive gratings to form a capacitor, said two capacitive grating forming the plates of said capacitor and said thin dielectric layers being the dielectric material between said plates, the axial movement of said scale being sensed based on changes in the capacitance of said capacitor between said scale and said pick-off body.

25. The apparatus according to claim 24 wherein the thickness of each of said thin dielectric layers is selected to ensure that based on the combined thickness of said two dielectric layers, the two capacitive gratings do not electrically short out over the operational voltage of said capacitor and said layers are thin to provide a relatively high capacitance for a given area of said capacitive gratings.

26. The apparatus according to claim 25 wherein each of said dielectric layers has a thickness of approximately five (5) microns for an operational voltage range from zero to five volts.

27. The apparatus according to claim 24 wherein said dielectric layer includes an epoxy filled with Teflon.

28. The apparatus according to claim 24 wherein said pick-off member includes a silicon substrate and said dielectric layer on said pick-off member is an oxide layer.

29. The apparatus according to claim 24 wherein the contacting surface area between said pick-off and said scale approximately equals the front surface area of said pick-off and the contacting surface area exceeds the area of the capacitive grating on said pick-off member.

30. The apparatus according to claim 24, further including a spring assembly coupled to said pick-off member for biasing the front surface of said pick-off member into abutting contact with the front surface of said scale as said scale moves axially within said housing, said spring assembly permitting said pick-off body to move normal to said axial motion to minimize errors caused by non-axial motion of said scale.

* * * * *